3,356,744
COPPER RECOVERY FROM PHENOL
REACTOR MIXTURE
Richard E. Woodward, Kalama, Wash., assignor to The
Dow Chemical Company, Midland, Mich., a corporation of Delaware
No Drawing. Filed Aug. 19, 1964, Ser. No. 390,749
3 Claims. (Cl. 260—621)

The present invention relates to an improved method of treating the reaction mixtures produced by the oxidation and decarboxylation of aryl monocarboxy compounds to make the corresponding phenols whereby catalytic metal salts and other valuable components are separated from the by-product tars. This invention particularly relates to such a method whereby better recoveries of copper salts are obtained.

It is known to convert aryl carboxylic acids or their anhydrides, esters, salts, and the like to the corresponding phenols by catalytic oxidation and decarboxylation of the carboxy compound at about 200–250° C. in the presence of its copper salt, and optionally, in the additional presence of its magnesium salt. Such a process is described in U.S. Patent Re. 24,848. In such a process the formation and accumulation of tarry by-products in the liquid reaction mixture represses the reaction. To obtain a continuously operating process, these tars must be removed from the reactor.

A number of methods have been described whereby portions of the reaction mixture are periodically or continuously withdrawn and extracted with an aqueous solvent such as water or aqueous methanol to separate the soluble valuable components for return to the process and to prevent accumulation of excess tar in the reactor. Such methods are disclosed in the above-mentioned patent and in U.S. Patents 2,954,407 and 3,130,235. While these prior art methods effectively remove the tar from the reactor liquid and also provide a means for recovering valuable compounds present in the mixture, the efficient recovery of copper salts in particular has not been fully achieved. The copper contained in reactor contents is usually present, at least in substantial proportion, in reduced form, i.e., as cuprous copper and to some extent as finely divided metallic copper. An aqueous extraction is capable of separating only a part of the copper thus contained. Additionally, it has been found that as the more soluble components of the reactor contents are removed from the reactor liquid by an aqueous extraction, the solubility of copper salts in the liquid is reduced, and a solid phase rich in copper is formed. This solid phase forms an insoluble sludge which is deposited in equipment and in process lines, necessitating frequent shutdowns and laborious cleaning operations.

It has now been found that improved copper recovery and minimal precipitation of copper in process lines and equipment is obtained in these aqueous extraction processes when reactor contents as described above are first contacted with an oxygen-containing gas, either oxygen or a mixture of oxygen with an inert gas, at an elevated temperature which is below process reactor temperatures before the contents are extracted with the aqueous solvent. This oxidation step has been found to convert the cuprous copper and at least a portion of any metallic copper present to the more soluble cupric state. In the process as operated to convert benzoic acid to phenol in the presence of cupric benzoate, the principal reactions believed to be taking place during this oxidation are:

(1) 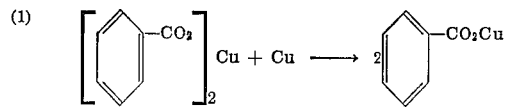

(2) 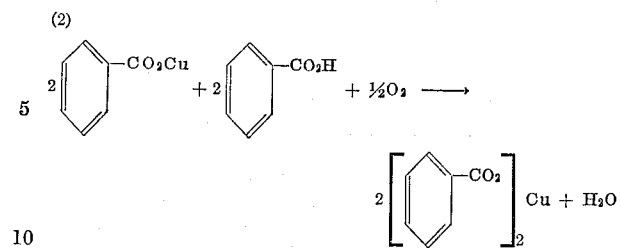

Both metallic copper and cuprous copper are oxidized to the cupric state.

By holding the temperature of the oxidation step between about 140° C. and about 200° C., and preferably above 150° C. and less than 200° C., the copper is oxidized but those reactions which involve reduction of the copper are substantially avoided.

Where benzoic acid is being converted to phenol, the reactor liquid is rich in benzoic acid and magnesium benzoate and it is thereby made capable of holding in solution both cuprous and cupric benzoates. As the benzoic acid and magnesium benzoate are removed from this liquid by an aqueous extraction, however, it loses its capacity to dissolve the copper salts and these salts are gradually precipitated. Since cuprous benzoate is relatively insoluble in the aqueous phase, it tends to remain as a solid precipitate along with any metallic copper. However, when the copper content of the reactor liquid diverted to the aqueous extraction has been substantially oxidized to the cupric state, as by the present process, any copper benzoate precipitated from the reactor liquid will then be largely dissolved by the aqueous phase.

The quantity of oxygen introduced during the oxidation step is not critical, for any significant quantity will improve to some extent the recovery of copper by aqueous extraction. It is preferred to use at least the theoretical quantity of oxygen required to oxidize all of the copper present, calculated as cuprous copper, to the cupric state. Best results are obtained when an excess of oxygen is employed, i.e., more than 0.25 mole of oxygen per atom of total copper.

Advantageous operation of the present invention as part of a process for making phenol from benzoic acid as described in U.S. Re. 24,848 comprises withdrawing from the main reactor a portion of liquid reactor contents which consists essentially of a solution of polymeric tar in benzoic acid plus small percentages of copper and magnesium salts and transferring this liquid mixture to an oxidizer, the mixture being cooled in transit to a temperature of about 140–200° C. The oxidizer is preferably fitted with an agitator to disperse the air and a jacket or other means to maintain the desired temperature. Air and the liquid mixture are introduced into the bottom of this reactor and the oxidized liquid is removed from a side outlet near its top. The air flow is controlled to provide a moderate excess of oxygen over that theoretically required to convert all reduced copper content to the cupric state. Under these conditions, the vent gas from the top of the reactor contains less than 15 percent by volume of oxygen and less than about 7 percent of carbon dioxide. The oxidized liquid mixture flows from its outlet to an aqueous extraction system where benzoic acid and soluble copper and magnesium salts are separated from the tar and are returned to the main process. Such operation is shown in more detail in Example 1.

*Example 1*

According to the procedure described in U.S. Patent Re. 24,848, a plant-scale phenol process reactor was charged with a mixture of benzoic acid, cupric benzoate, and magnesium oxide, the mixture was heated to about 230° C., and streams of air and steam were introduced near the bottom of the reactor and bubbled upward through the liquid reaction mixture at the above temperature. Gases and volatile reaction products passed from the top of the reactor to a product recovery system where the desired phenol product was separated and purified. In the course of operation, benzoic acid was continuously fed into the phenol reactor while liquid reaction mixture was continuously drawn off. The liquid reaction mixture withdrawn contained about 15 percent by weight of polymeric tar, 2.5 percent of magnesium benzoate, and 1.5 percent of copper. This liquid reaction mixture was continuously transferred to an upright cylindrical oxidizer where air was bubbled through the liquid mixture at about 170° C. in a quantity sufficient to supply about 150 percent of the oxygen theoretically required to oxidize the total copper content from cuprous copper to the cupric state. The oxidized reaction mixture then flowed to a continuous extraction system where it was extracted under pressure with about 3 parts by weight of water at about 140° C. The aqueous extract thereby obtained contained, as a soluble copper salt, 80 percent of the copper originally present in the reactor liquid charged to the extraction process.

When the above procedure was repeated with the omission of the oxidation of the reaction mixture, only 50 percent of the copper content was recoverable by the aqueous extraction. In addition, equipment and process lines leading from the extraction system rapidly plugged with a sludge rich in precipitated copper and cuprous benzoate whereas these had remained essentially clear when the oxidation step was used.

Example 2

The table below illustrates the effect of temperature on the composition of vent gas from the oxidizer unit during continuous operation in the manner described in Example 1. In each case, the vent gas analysis represents the composition obtained after equilibrium conditions had been reached at the indicated temperature. The air flow was controlled at a rate calculated to supply about 130 percent of the oxygen theoretically required to convert all of the copper present in the oxidizer feed from the cuprous to the cupric state.

| Temp., ° C. | Vent Gas Analysis Volume, percent | |
|---|---|---|
| | $O_2$ | $CO_2$ |
| 140 | 11.5 | 0 |
| 157 | 13 | 3 |
| 175 | 10 | 4.5 |
| 185 | 10 | 5 |
| 193 | 9 | 6 |
| 215 | 3 | 20 |

The loss of oxygen from the air stream shown above is an indication that the oxidation of reduced copper is occurring. The presence of $CO_2$ is evidence that the decarboxylation reactions which produce reduced copper are also occurring to some extent, so that if the air flow were cut off, the copper would be reduced to a substantial extent at the higher temperatures.

The pressure at which this oxidation step is operated does not affect the results obtained to a significant degree. While superatmospheric operation can be employed if desired, it is usually most convenient to run the oxidation step at about atmospheric pressure.

This process improvement as it is described in Examples 1 and 2 is advantageously applicable to similar processes wherein aryl monocarboxy compounds other than benzoic acid are oxidized in the presence of a copper compound to the corresponding phenol. For example, processes employing benzoic acids having stable substituents such as alkyl, alkoxy, phenyl, and nitro and having at least one open position on the benzene ring adjacent to the carboxyl are adaptable to the present improved method and the results thereby obtained are similar to those shown in the above examples.

I claim:
1. In a process for converting an aryl monocarboxy compound to the corresponding aryl hydroxy compound by forming a liquid reaction mixture comprising the aryl monocarboxy compound and a copper compound soluble in the reaction mixture and heating said reaction mixture in a reaction zone at a temperature of 200–250° C. in the presence of an oxygen-containing gas and water vapor and wherein at least a portion of said reaction mixture is withdrawn from said reaction zone and is intimately contacted with a liquid aqueous solvent to extract soluble components therefrom, the improvement wherein said reaction mixture, after being withdrawn from said reaction zone and prior to being contacted with said aqueous solvent, is contacted with an oxygen-containing gas at a temperature of at least about 140° C. but less than 200° C.

2. The process of claim 1 wherein the aryl monocarboxy compound is benzoic acid.

3. The process of claim 1 wherein the reaction mixture is contacted with at least about 0.25 mole of oxygen per atom of copper therein contained.

References Cited

UNITED STATES PATENTS

| Re. 28,848 | 7/1960 | Kaeding et al. | 260—621 |
| 2,852,567 | 9/1958 | Barnard et al. | 260—621 |
| 2,954,407 | 9/1960 | Taplin | 260—621 |

LEON ZITVER, *Primary Examiner.*

H. ROBERTS, *Assistant Examiner.*